J. F. SCHURLE.
WEED CUTTER.
APPLICATION FILED OCT. 10, 1911.
1,047,578.
Patented Dec. 17, 1912.
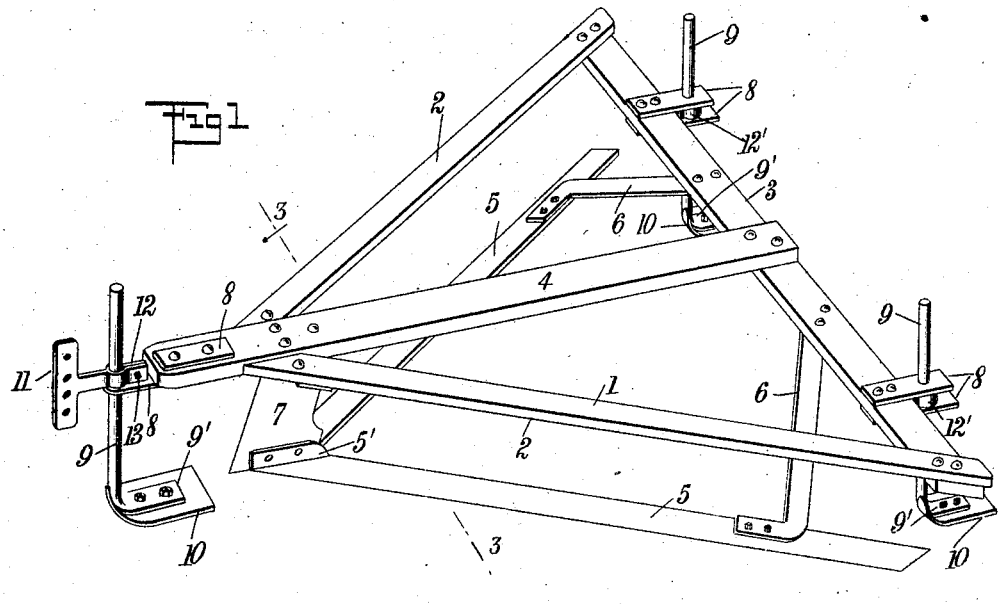
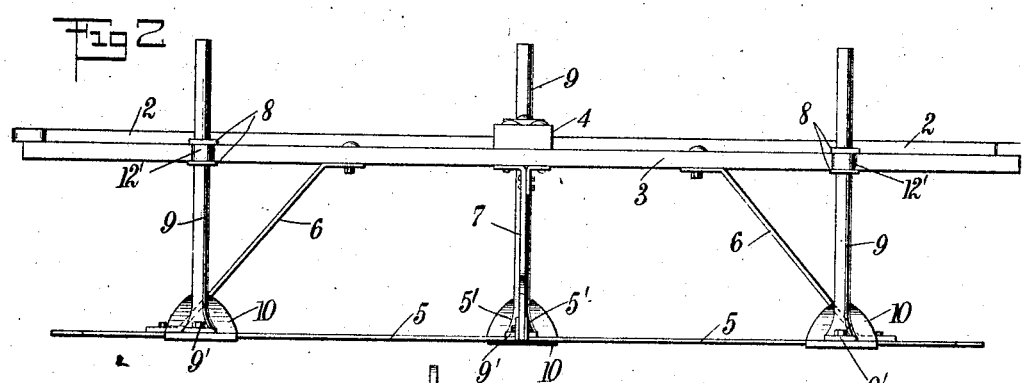
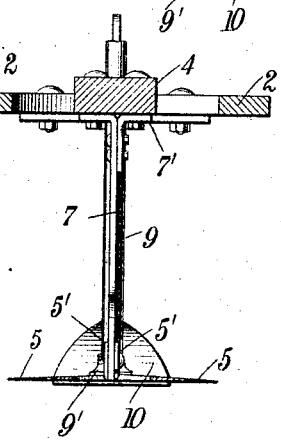
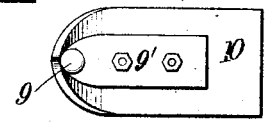
WITNESSES
C. J. Hachenberg
Wm. F. Nickel
INVENTOR
John F. Schurle
BY Munn & Co
ATTORNEYS

UNITED STATES PATENT OFFICE.

JOHN FRED SCHURLE, OF CASHMERE, WASHINGTON.

WEED-CUTTER.

1,047,578.

Specification of Letters Patent.

Patented Dec. 17, 1912.

Application filed October 10, 1911. Serial No. 653,772.

*To all whom it may concern:*

Be it known that I, JOHN F. SCHURLE, a citizen of the United States, and a resident of Cashmere, in the county of Chelan and State of Washington, have invented a new and Improved Weed-Cutter, of which the following is a full, clear, and exact description.

My invention relates to implements for clearing the ground of weeds, of the type which is designed to be pulled by a draft animal when in operation; and it comprises a frame carrying means for cutting weeds and other objectionable vegetable growths, and supported upon a plurality of adjustable guides or shoes which enable the frame to move over the ground at any desired height therefrom.

Reference is to be had to the accompanying drawings forming a part of this specification, in which the same characters of reference indicate the same parts in all the views.

Figure 1 is a perspective view of my improved weeder; Fig. 2 is a rear elevation thereof; Fig. 3 is a transverse vertical section on the line 3—3 of Fig. 1; and Fig. 4 is a top plan of one of the shoes or guides which support the weeder frame when it is being drawn over the ground.

My improved weeder as shown on the drawings includes a framework 1, preferably triangular in form, the framework being made up of a plurality of bars 2 and 3, the bar 3 being the base bar and being located at the rear of the frame, and the bars 2 forming the sides or legs of the triangle, and being arranged so that they converge toward each other in a forward direction. These bars are united at their front ends to a draw-bar 4, which extends through the framework and is fastened to the base bar 3 at its rear end. Beneath the framework 1 is carried a number of cutter blades or knives 5, these cutter blades or knives corresponding in number to the side bars 2, and being preferably arranged substantially beneath and parallel with the side bars 2. These cutter knives or blades are united by arms 6 to the bar 3, these arms 6 being secured to the blades 5 adjacent their rear ends, and sloping downward from the bar 3, as shown in Fig. 2; and the forward ends of the knife blades 5 are bent upward, as shown at 5′, and riveted to the lower edge of a vertical fin 7. This vertical fin 7 is bent over along the top edge thereof and secured to the under side of the draw-bar 4, as shown in Fig. 3. An angle-iron 7′ is secured to the upper part of the fin 7 and the draw-bar 4, to strengthen the connection between these two elements.

The numerals 8 represent a pair of plates secured to the top and bottom of the draw-bar 4, and projecting beyond the forward end thereof, as shown in Fig. 1. These plates are perforated at their outer ends to give passage to a supporting bar 9, which has its lower end flattened and bent to the rear, as shown at 9′; and to this bent end is secured a sliding shoe 10.

The numeral 11 is a T-shaped projection having a number of apertures therein to attach the harness of the draft animal thereto, and this attachment has one end thereof divided to form a clamp, as shown at 12. The members of this clamp are drawn together by means of a fastening bolt or the like, shown at 13; and when this T-shaped attachment is put in position between the plates 8, in such a way that the clamp 12 will embrace the bar 9, this clamp 12 when tightened will adjustably secure the bar 9 to the frame 1, to support the frame any required distance above the ground. It will be noted that the clamp 12 will merely prevent the bar from sliding up and down in front of the frame 1, but will not prevent it from turning.

The plates 8 are also secured to the bar 3 to project rearwardly therefrom on each side of the draw-bar 4, and supporting bars 9 pass through the perforations in these plates, to support the rear of the frame on shoes 10, exactly as the front of the frame is supported. The clamping members 12′ embrace each of the rear supporting bars 9 between the rear plates 8, to hold the rear bars 9 in adjusted position, these clamps 12′ permitting the rear bars 9 to turn, but preventing them from sliding up and down, exactly like the clamp 12.

In operation, the bars 9 are made to support the framework of the weeder at such a height that when the weeding implement is drawn over the ground the cutter knives 5 will move beneath the surface of the ground and cut the weeds off at the roots. By adjusting the bars 9, the depth beneath the surface at which the cutter blades 5 will operate can be varied at will, and in this way all of the weeds and other objectionable vegetable growths in a plot of ground can be cut down and destroyed.

My weeder is especially designed for use in orchards, but obviously it may be utilized in any location where there is need for the same. The forward edges of the blades or cutters 5 will of course be sharpened to cut the weeds through at the roots; and as these blades pass through the soil below the surface edgewise, they act to pulverize the ground without making furrows or ridges, and thus condition the soil for further work when the same is to be used for purposes of cultivation.

Referring to Fig. 3, it will be seen that the top surfaces of the blades 5 slope downward to a slight extent toward the front. This will tend to force the blades into the ground as far as the shoes 10 will permit. At the same time, the vertical fin in front will not only form a support for the front ends of the blades, but the front edge thereof will cut through tough roots as the implement moves forward, and thus the blades will be prevented from moving sidewise whenever obstructions are encountered. It will be further observed that the supporting bars 9, even when rigidly embraced by the clamps 12 and 12' so they cannot move up or down through the plates 8, will nevertheless be rotatable with respect to the plates 8. This will allow the weeder to be easily turned, without any effort at all on the part of the operator.

I wish to have it understood that I reserve to myself the right to make whatever changes in the shape, size and arrangement of the parts as fairly come within the scope and spirit of my invention.

Having thus described my invention, I claim as new and desire to secure by Letters Patent:

1. A weeding and cultivating implement comprising a frame, a plurality of pairs of superposed plates secured to said frame, each pair of said plates having perforations in vertical alinement therethrough, a sliding shoe having a shank for each pair of said plates, said shanks passing through the perforations therein, and a clamp secured to each of said shanks between the plates, to hold said shank against vertical movement, while permitting the same to rotate in said perforated plates, one of said shoes being arranged at the front of the frame, and the clamp therefor having means for attaching a draft animal thereto.

2. A weeding and cultivating implement comprising a triangular frame, the base of said frame forming the rear thereof, a plurality of superposed plates secured to the base and to the front of the frame, each pair of plates having perforations in vertical alinement therethrough, and a sliding shoe having an upright shank for each of said pairs of plates, said shanks passing through the perforations in said plates, and a clamp secured to each of said shanks between said plates to hold the shanks against bodily movement, while permitting them to rotate, the clamp for the shoe at the front end of the frame having means for attaching a draft animal thereto.

In testimony whereof I have signed my name to this specification in the presence of two subscribing witnesses.

JOHN FRED SCHURLE.

Witnesses:
A. R. McKeown,
Charles F. Wallace.